April 15, 1969  L. B. LOTTI  3,438,246
HYDRAULIC LEAK TESTING SYSTEM AND APPARATUS
Filed June 19, 1967
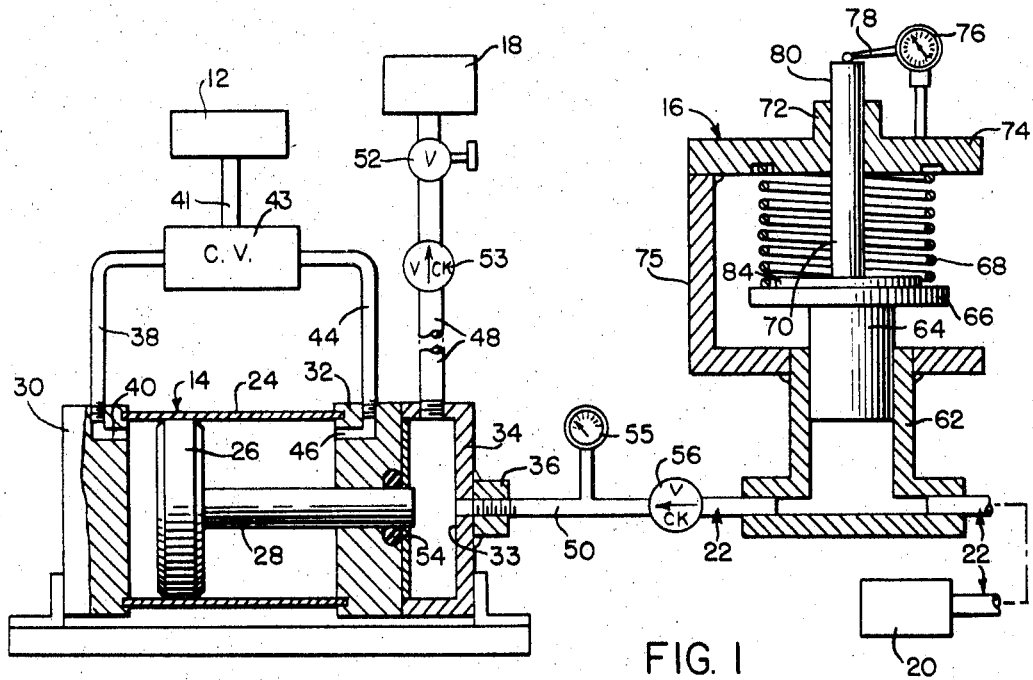
FIG. 1
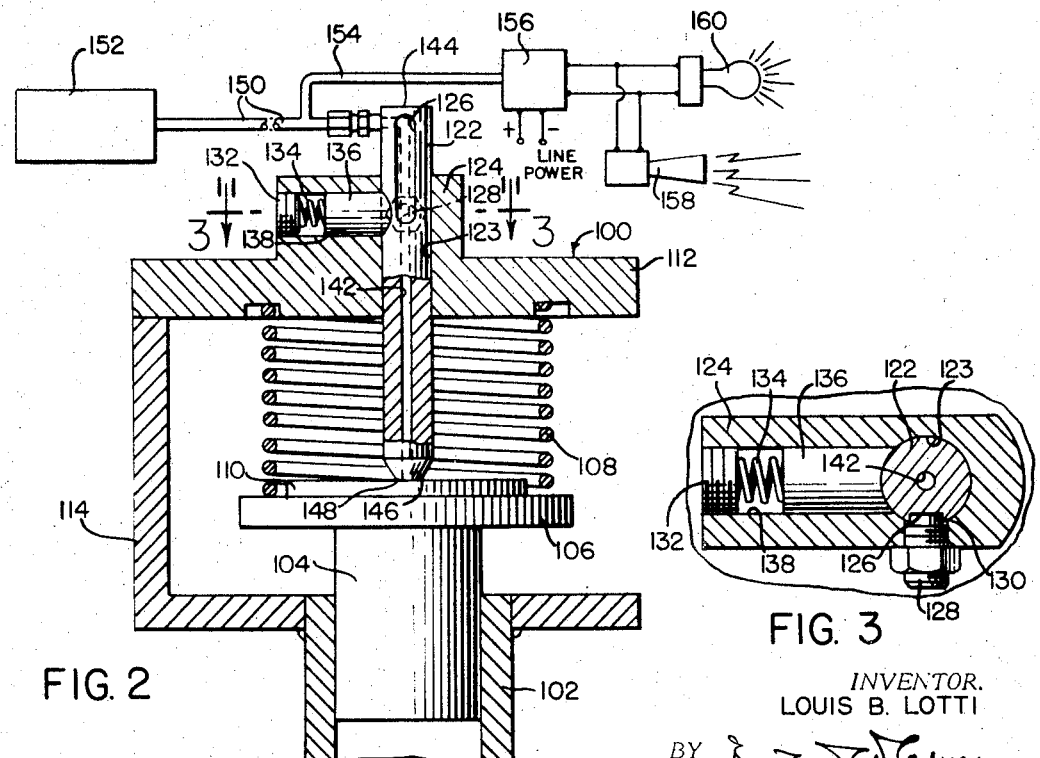
FIG. 2
FIG. 3
INVENTOR.
LOUIS B. LOTTI
BY
ATTORNEY United States Patent Office 3,438,246
Patented Apr. 15, 1969

3,438,246
HYDRAULIC LEAK TESTING SYSTEM AND
APPARATUS
Louis B. Lotti, St. Clair Shores, Mich., assignor to Stellar
Engineering, Inc., Warren, Mich., a corporation of
Michigan
Filed June 19, 1967, Ser. No. 646,879
Int. Cl. G01m 3/04
U.S. Cl. 73—40                                    16 Claims

ABSTRACT OF THE DISCLOSURE

The hydraulic leak testing system and appartus of this invention comprises a hydraulic force piston device applying pressure to a hydraulic fluid-filled line, system or device to be tested for leakage, in combination with an associatedly operated hydraulic fluid line testing device responsive to movement of fluid in such line, system or device to be tested upon the application of pressure thereto and the discharge of such fluid from the unit being tested. The associated testing device is arranged to maintain an initial set position after the force piston device has applied excess pressure to the testing device and to the hydraulic unit to be tested. Upon loss of hydraulic fluid under such excess pressure from the hydraulic unit being tested, in one form of the apparatus, a separation of parts in the associated testing device is arranged to occur, producing a gap between them, through which gap a discharge of pressurized fluid will occur, effecting the actuation of an associated audible and/or visible signal. In an alternative form of apparatus, loss of hydraulic fluid in the hydraulic unit to be tested is sensed by a visual indicator forming a part of the associated testing device.

---

The inventive apparatus, in exemplary embodiments of the invention, comprise in each instance a main booster force applying device operatively connected to and operative upon a hydraulic fluid-filled unit to be tested, in which unit excess fluid pressure is applied for the detection of hydraulic fluid leakage anywhere in such line or device. In a hydraulic filled conduit communicating with the unit to be tested is an associated testing device having a test ram under pressure bearing upon the hydraulic fluid in such conduit and movable in response to an increase or decrease in the pressure of the hydraulic fluid filled unit to be tested. Making contiguous bearing contact with the ram is a test pin, whereby upon movement of the test ram in the direction of the hydraulic fluid filled line separation of the ram from the test pin will occur, effecting the actuation of an audible and/or visible signal. Alternatively, movement of the test ram in the direction of the hydraulic fluid filled line can also be sensed with a test pin and a visual indicator. Movement of the test pin or ram upon flow of hydraulic fluid in the unit to be tested produces a change in position which provides means for sensor response.

Application for the invention include automotive and aircraft machines, hydraulic fluid filled lines, systems and devices of all types, servo-mechanisms, valves, pumps, hydraulic turbines and many other hydraulic or hydraulic-driven devices.

It is an object of the invention to provide a system for hydraulic fluid leakage detection in a hydraulic fluid-filled line, system or device to be tested so that leakage is made apparent through the operation of a force applying piston device and an associated testing device upon the hydraulic fluid in such piston device, testing device and the hydraulic unit to be tested. Another object is to provide apparatus in such system, wherein the piston device applies excess fluid pressure simultaneously to the testing device and to the hydraulic unit to be tested. Still another object is to provide apparatus in which the initial excess fluid pressure is substantially maintained by the testing device, after the force applying piston device has been rendered inactive and has discontinued any further application of hydraulic fluid pressure, for the detection of leakage in the hydraulic unit to be tested. A further object is to provide a system and apparatus in which the occurrence of a gap between elements of the test device effects the actuation of an audible and/or visible signal. Yet another object is to provide apparatus in such a system in order that, upon the occurrence of hydraulic fluid leakage in the unit to be tested, a test device responsive to a change in pressure or movement of fluid in the hydraulic unit to be tested will operate in relationship to such change or flow and effect the actuation of an audible and/or visible signal.

These and other objects of the invention and features of construction, and advantages of the invention will become more clearly apparent from the following description taken in conjunction with the accompanying drawings, in which:

FIGURE 1 is a substantially vertical sectional view through apparatus that can be utilized in the system of this invention.

FIGURE 2 is an enlarged vertical sectional view of a modified test device that can be utilized in the apparatus illustrated in FIGURE 1.

FIGURE 3 is a fragmentary substantially horizontal sectional view taken on the line 3—3 of FIGURE 2.

Referring to the several views of the drawing, and with particular reference to FIGURE 1, a hydraulic fluid leakage detection system 10 comprises a pressurized air or hydraulic fluid supply source 12, a main booster cylinder and piston device 14, a test device 16, a hydraulic fluid supply source 18, a hydraulic fluid operated unit 20 to be tested which may be a line, system or device, and a hydraulic fluid filled line 22 communicating with and connecting the device 14 and the unit 20 to be tested, the test device 16 communicating and being associatedly connected with the line 22.

The main booster device 14 comprises a cylinder 24, a booster piston 26 and a force multiplier piston 28, a rear end block 30, a forward end block 32, a hydraulic fluid chamber 33 in a housing 34 and a hydraulic fluid discharge conduit 36. The booster piston 26 is operatively moved by pressurized air (or hydraulic fluid) from the supply source 12 communicating with the cylinder 24 through an air input conduit 38 and passage 40 in the rear end block 30, in a direction such that the multiplier piston 28 moves forwardly into the hydraulic fluid chamber 33. Booster piston 26 is moved in a reverse or rearwardly direction by the pressurized air supply when it is introduced into cylinder 24 through conduit 44 and passage 46 in forward end block 32. The air supply source 12 communicates with the conduits 38 and 44 serving the cylinder 24 by way of conduit 41 and a control valve 43 to which conduits 38 and 44 are connected. The hydraulic fluid chamber housing 34, secured to the forward end block 32, is served by a conduit 48 with hydraulic fluid supplied by the source 18, the fluid being charged into the chamber for discharge through the output conduit 36 and the connected conduit 50 communicating with the unit 20 to be tested. A control valve 52 and a check valve 53 are disposed in the conduit 48 to prevent backflow to the supply source 18 of the hydraulic fluid when pressure is applied to the multiplier piston 28 in the chamber 33. A fluid seal 54 is secured above the multiplier piston 28 at the housing 34 in the end block 32 to limit the loss of pressure in the chamber 33. Associatedly connected to and communicating with the intermediate hydraulic fluid conduit 50 are a pressure gage 55, a check valve 56, and the test device 16.

In the apparatus illustrated in FIGURE 1, the test device 16 comprises a portion of conduit 50, in the line 22, which connects to and communicates with cylinder 62, a test ram 64 movably disposed in the cylinder and having a platform 66 thereon supporting a spring 68 and a conjoined test pin 70 slidable in a bearing support 72, and an upper platform 74. The latter is arranged with an annular groove to receive one end of the spring 68 which is held in compression against the ram platform 66. The upper platform 74 is supported by a bracket 75 secured to the cylinder 62, or it may be secured to any other suitable means. Mounted upon the upper platform 74 is a conventional dial type indicator 76 having its sensing probe 78 adapted to rest upon and engage the upper digital end 80 of the test pin 70. The proximal end of the test pin may be integrally formed with or secured directly to the ram platform 66 or to a spacer plate 84 mounted upon the platform and providing a centering means for the spring 68.

An alternate test device 100 is that illustrated in FIGURE 2, and comprises a test cylinder 102, a test ram 104 having a platform 106 secured to its upper end and supporting a spring 108 bearing thereupon. A centering plate 110 secured to the upper side of the platform 106 provides a centering means for the spring 108. Surmounting the spring 108 is an upper platform 112 supported upon a bracket 114 attached to the cylinder 102 (or to any other suitable means), the spring 108 being held in compression between the upper platform 112 and the test ram platform 106. A test pin 122 is slidably mounted in a bore 123 in the upper platform 112 and its hub 124, and is provided with a longitudinally extending slot 126. The test pin may be manually movable or arranged for automatic controlled movement. The hub is arranged with a lateral screw 128 having its forward end 130 disposed within the slot 126 for limiting longitudinal travel of the test pin 122 in hub 124 to the length of the slot. The hub is also provided with a screw 132, a spring 134 and a friction saddle 136 in an opening 138 communicating with the test pin bore 123. The saddle provides frictional engagement with the test pin 122 for the purposes and operations which will be described more fully below. The test pin is further provided with a passageway 142 extending from its proximal end 144 to its digital end 146, exiting at the digital end face 148 which makes contiguous bearing contact with the spring centering plate 110. The passage 142 is served by a conduit 150 communicating with a source of air (or hydraulic fluid) supply 152, the conduit 150 being connected to the passage at the proximal end 144 of the test pin. A supplementary conduit 154 is T-connected to the conduit 150 and communicates with a control device 156 serving an electrically connected audible horn 158 and a visually observable signal light 160.

To operate the system illustrated in FIGURE 1, the hydraulic unit 20 to be tested is first bled upon the application of hydraulic fluid under pressure from the supply source 18. The bleed devices and the control valve 52 are then closed while pressure is applied to and maintained upon the hydraulic fluid in chamber 33 by the booster piston and force multiplier piston 28 operating under the air pressure of supply source 12. Such pressure may be of any magnitude sufficient to maintain above atmospheric pressure to the hydraulic fluid in chamber 33, the portion of conduit 48 up to control valve 52, and in conduits 36 and 50 communicating with the test device 16 and the unit 20 to be tested. Check valve 53 prevents fluid from backing into the supply source 18 when chamber 33 is placed under high pressure. Pressureized air (or hydraulic fluid) from the supply 12 through conduit 41 to the control valve 43 serves the booster device 14 by way of conduits 41 and 38, control valve 43, passage 40 and cylinder 24. Booster piston 26 is advanced forwardly under air pressure and multiplier piston 28 advances into the fluid chamber 33 to apply extremely high pressure to the fluid therein.

The pressures that can be applied to the hydraulic fluid in chamber 33 and conduit 50 and the unit 20 to be tested by the multiplier piston 28 are substantial and, under such circumstances, leakage of even a drop or two in the line, system or device 20 to be tested can be signalled. By adjusting the dimensional characteristics of the booster cylinder, piston and multiplier piston, pressures of up to or more than 2000 pounds per square inch can be developed in the conduit 50 and in the unit 20 to be tested.

As shown particularly in the apparatus and system of FIGURE 1, when hydraulic fluid pressure is applied in chamber 33 the ram 64 is placed in compression against the spring 68, and the hydraulic fluid in cylinder 62 and unit 20 to be tested is subject to the pressure applied by the multiplier piston 28 to the fluid. The test pin 70 conjoined to the platform 66 or the centering plate 84, as the case may be, moves upwardly (or downwardly) in the bearing 72 and upper platform 74, the dial indicator probe 78 signalling the test pin movement on the dial face of indicator 76. The pressurized air supply from source 12 through conduit 38 to the cylinder 24 is then cut off, and the booster piston 26 returned to its retracted position at the left end of cylinder 24 by operation of control valve 43 which now passes the pressurized air from source 12 through conduit 44 and passageway 32 to cylinder 24. When this changeover occurs, check valve 56 maintains the hydraulic fluid pressure in line 22, test device 16 and unit 20 to be tested at the elevated excess leak-testing pressure first applied by the main booster device 14. Once excess pressure by the booster piston device 14 has been applied to the unit 20 to be tested, the pressure exerted upon the ram platform 66 by the compression spring 68 will cause the hydraulic fluid in the conduit system 22 to reach a static equilibrium, if there is no leakage in the unit 20 to be tested, or to signal on the dial face of the indicator 76 the presence of such leakage by an advance movement of the ram 64 upon expansion of the spring 68.

It will of course be understood that the effective pressure of the main booster piston device 14 is substantially equal to the compression-expansion force of the spring 68 in the test device 16. The expansion-compression force of spring 68 is preferably greater than the maximum pressure, or the test pressure, which can be or is exerted by the booster multiplier piston 28 upon the hydraulic fluid in the chamber 33 and the communicating line 22 leading to the test device 16 and the unit 20 to be tested. Thus, once the booster piston device 14 has attained and applied the test pressure, the application of force by the ram 64, under the urging of spring 68, to the hydraulic fluid in the unit 20 to be tested will be sufficient to effect fluid movemnt should leakage in the unit 20 be present.

The operation of the test device 100 in FIGURE 2 is similar to that described for the test device 16 in FIGURE 1, except that the pressurized air (or hydraulic fluid) supply of the source 152 serves the test pin 122 through passage 142 to indicate and signal the presence of a gap created by separation of the centering plate 110 from the end face 148 at the test pin digital end 146. When hydraulic fluid pressure is applied by the multiplier piston 28 to the fluid in chamber 33 and the associated communicating line 22, the ram 104 transmits such pressure to the spring 108 which is then compressed against the upper platform 112. Test pin 122 is moved upwardly until the maximum or test pressure upon the hydraulic fluid is reached. Thereupon, the expansion force of spring 108 will cause the ram 104 to drive the hydraulic fluid through any leakage points in the unit 20 to be tested, if leakage is present. In such event, the centering plate 110 will separate from its contact with end face 148 to produce a gap therebetween and allow the escape of pressurized air from source 152. The pressure in conduit 150 will drop and control 156 will be actuated to produce a signal from a device such as the audible horn 158 and/or the light 160. The friction saddle 136 holds the test pin 122 in the position reached upon the application of test pressure in the line 22.

It is of course to be understood that the signalling devices, including the dial indicator 76, the audible horn 158 and the visible light 160 are merely representative of many which can be utilized in association with a test pin according to the apparatus and system herein described. Sources of pressurized air or hydraulic fluid, valves and controls described in the systems of FIGURES 1 and 2 may be actuated by electrical solenoid devices, fluid operated devices or by other devices generally well known and available in industry to perform the necessary and desirable function of actuation. Their utilization in the apparatus herein described is well within the skill of persons skilled in the art to which the invention pertains.

The hydraulic fluid supply unit 18 normally comprises a supply tank of such fluid and an electrically operated pump to drive the fluid under pressure through conduit 48 to the compression chamber 33, line 22, the test device 16 and the unit 20 to be tested. However, other means to furnish such hydraulic fluid under pressure may also be employed. Similarly, the air or hydraulic fluid supply unit 12 or 152 serving the booster piston device 14 and the test pin 122 generally comprises a reservoir or supply tank and an electrically operated pump. Equivalent means may also be utilized.

It will, of course, be clearly understood that the apparatus and system of this invention is utilizable in connection with the leakage detection of all types of hydraulic fluid filled lines, devices and systems, and that the particular systems described above and illustrated in the drawing, FIGURES 1 and 2 are only two applications or examples of systems in which the apparatus and system of this invention can be utilized.

Although certain particular embodiments of the invention are herein disclosed for purposes of explanation, further modifications thereof, after study of this specification, will be apparent to those skilled in the art to which the invention pertains.

I claim:
1. In a detection system for detecting hydraulic fluid leake in
   a first hydraulic fluid means to be tested,
   second means for applying pressure to the hydraulic fluid in said first means substantially in excess of the operating pressure to which said hydraulic fluid is normally subject,
   a conduit for the hydraulic fluid connecting said first and second means,
   third means connected to and in communication with said conduit and operatively responsive to the application of said excess pressure,
   and hydraulic fluid check valve means in said conduit disposed between said second and third means,
   said third means including a test cylinder in communication with said conduit, a test ram movable in said cylinder, spring means biasing said ram against the hydraulic fluid in said cylinder, and applying continuing and substantially constant pressure thereto in said cylinder and said conduit to said check valve means and said first hydraulic fluid means to be tested, and a test pin member adapted to be brought into contiguous contact with said ram,
   and fourth means associated with said test pin member to signal movement of said ram under influence of said spring means during application of said excess fluid pressure upon the flow by leakage of hydraulic fluid from said first hydraulic fluid means to be tested.
2. The system defined in claim 1, and including
   fifth means for supporting said test pin member substantially in alignment with said test ram.
3. The system defined in claim 2, wherein
   sensing means is supported by said fifth means in direct association with said test pin member to sense the movement of said ram and test pin member.
4. The system defined in claim 3, wherein
   said sensor comprises a dial indicator.
5. The system defined in claim 1, wherein
   said test pin member is adapted to be moved into an initial contact position with said test ram,
   and friction means for holding said test pin member in a static position during a period of continuing application of excess fluid pressure in said first hydraulic fluid means to be tested.
6. The system defined in claim 5, wherein
   a gap is produced between said test pin member and said test ram upon advance of said ram under the influence of said spring means due to leakage of hydraulic fluid from said first hydraulic fluid means to be tested.
7. The system defined in claim 5, wherein
   said test pin member is provided with a passageway therethrough terminating at the digital end thereof adjacent said test ram,
   and said test pin member passageway is charged with pressurized fluid.
8. The system defined in claim 7, wherein
   the contacting surfaces of said test pin member and ram provide a closure for said passageway at said digital end.
9. The system defined in claim 8, wherein
   the passageway of said test pin member being charged with pressurized fluid, when separation between said contacting surfaces occurs, said pressurized fluid escapes through the gap between said surfaces.
10. The system defined in claim 5, wherein
    said test pin member is adapted to be moved manually into an initial contiguous contact with said test ram.
11. The system defined in claim 5, wherein
    a sensor system is operatively associated with said test pin member,
      said sensor system being responsive to separation of said test pin member from said test ram and being adapted to actuate a signalling device in said sensor system.
12. The system defined in claim 11, wherein
    said signalling device comprises an audible signal device.
13. The system defined in claim 11, wherein
    said signalling device comprises a visible signal device.
14. The system defined in claim 1, wherein
    said first hydraulic fluid means to be tested comprises a hydraulic fluid line.
15. The system defined in claim 1, wherein said first hydraulic fluid means to be tested comprises a hydraulic fluid system.

16. The system defined in claim 1, wherein said first hydraulic fluid means to be tested comprises a hydraulic fluid device.

References Cited

UNITED STATES PATENTS

| | | | |
|---|---|---|---|
| 909,950 | 1/1909 | Schreidt | 73—46 |
| 2,472,973 | 6/1949 | Hoffman et al. | 73—40 |
| 2,961,868 | 11/1960 | Hooper | 73—40 |
| 3,090,221 | 5/1963 | Cosby | 73—40 |
| 3,092,821 | 6/1963 | Muehlner | 73—40 XR |
| 3,360,982 | 1/1968 | Mitchell et al. | 73—40 |

LOUIS R. PRINCE, *Primary Examiner.*

JEFFREY NOLTON, *Assistant Examiner.*

U.S. Cl. X.R.

200—82; 340—242